US007382723B2

(12) United States Patent
Sutoh et al.

(10) Patent No.: US 7,382,723 B2
(45) Date of Patent: Jun. 3, 2008

(54) HITLESS SWITCHING SYSTEM AND TRANSMISSION APPARATUS

(75) Inventors: Atsushi Sutoh, Tokyo (JP); Kazuhiro Oda, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 883 days.

(21) Appl. No.: 10/376,262

(22) Filed: Mar. 3, 2003

(65) Prior Publication Data

US 2003/0165115 A1  Sep. 4, 2003

(30) Foreign Application Priority Data

Mar. 1, 2002  (JP)  ............................. 2002-056320

(51) Int. Cl.
*H04J 1/16*  (2006.01)
(52) U.S. Cl. ....................................... 370/227; 370/535
(58) Field of Classification Search ................ 370/216, 370/227, 228, 247, 248, 252, 254, 470, 442, 370/389, 223, 535, 503, 395.51
See application file for complete search history.

(56) References Cited

U.S. PATENT DOCUMENTS

| 4,908,839 | A |   | 3/1990 | Morimoto et al. |          |
|-----------|---|---|--------|-----------------|----------|
| 5,029,333 | A | * | 7/1991 | Graves et al.   | 370/490  |
| 5,442,620 | A | * | 8/1995 | Kremer          | 370/224  |
| 5,461,622 | A | * | 10/1995| Bleickardt et al.| 370/470 |
| 5,631,896 | A | * | 5/1997 | Kawase et al.   | 370/228  |
| 5,825,821 | A | * | 10/1998| Okuyama         | 375/260  |
| 6,118,795 | A | * | 9/2000 | Fukunaga et al. | 370/503  |
| 6,246,668 | B1| * | 6/2001 | Kusyk           | 370/228  |
| 6,490,282 | B1| * | 12/2002| Ikematsu        | 370/395.1|
| 6,678,241 | B1| * | 1/2004 | Gai et al.      | 370/216  |

(Continued)

FOREIGN PATENT DOCUMENTS

EP  0 696 111 A2  2/1996

(Continued)

OTHER PUBLICATIONS

Nevin Jones, et al., "A proposal for SONET Standards on Virtual Concatenation of High Order and Low Order SPEs", Lucent Technologies, Nortel Networks. URL:http://www.t1.org/filemgr/file-search.taf?_function=list&_UserReference=622B9A2345CDC7-DE39EDB1D6>, XP-002150418, Jan. 17-21, 2000, pp. 1-11.
A. Sutoh, et al., IEICE, pp. 1-16, "Study of Hitless Switching With Virtual Concatenation Technologies", Mar. 7, 2002.

*Primary Examiner*—Ricky Q. Ngo
*Assistant Examiner*—Kan Yuen
(74) *Attorney, Agent, or Firm*—Oblon, Spivak, McClelland, Maier & Neustadt, P.C.

(57) ABSTRACT

A hitless switching system includes a sending apparatus and a receiving apparatus. The sending apparatus includes: a distributing part for dividing an original signal into a plurality of signals; and a transmitting part for transmitting the divided signals over one or a plurality of transmission lines with redundancy. The receiving apparatus includes: a phase difference detection part for detecting phase differences between signals sent from the sending apparatus; a phase difference absorbing part for absorbing phase differences detected by the phase difference detection part; selectors each of which selects one signal from a plurality of signals; and a restoring part for restoring the original signal from the signals output from the selectors.

10 Claims, 9 Drawing Sheets

U.S. PATENT DOCUMENTS

| | | | |
|---|---|---|---|
| 6,870,859 B1 * | 3/2005 | Kozaki et al. | 370/535 |
| 6,963,560 B2 * | 11/2005 | Sawey et al. | 370/353 |
| 7,079,541 B1 * | 7/2006 | Loussouarn et al. | 370/395.51 |
| 7,167,442 B2 * | 1/2007 | Courtney et al. | 370/217 |
| 2001/0046207 A1 * | 11/2001 | Isonuma et al. | 370/223 |
| 2002/0018261 A1 | 2/2002 | Takeguchi et al. | |
| 2002/0018468 A1 * | 2/2002 | Nishihara | 370/389 |
| 2002/0080812 A1 * | 6/2002 | Stadler et al. | 370/442 |
| 2003/0043838 A1 * | 3/2003 | Shimada et al. | 370/442 |

FOREIGN PATENT DOCUMENTS

| | | |
|---|---|---|
| EP | 1 261 157 A2 | 11/2002 |
| JP | 62-137934 | 6/1987 |
| JP | 07-095186 | 4/1995 |
| JP | 2001-053705 | 2/2001 |
| JP | 2002-026855 | 1/2002 |
| WO | WO 01/31818 A1 | 5/2001 |

* cited by examiner

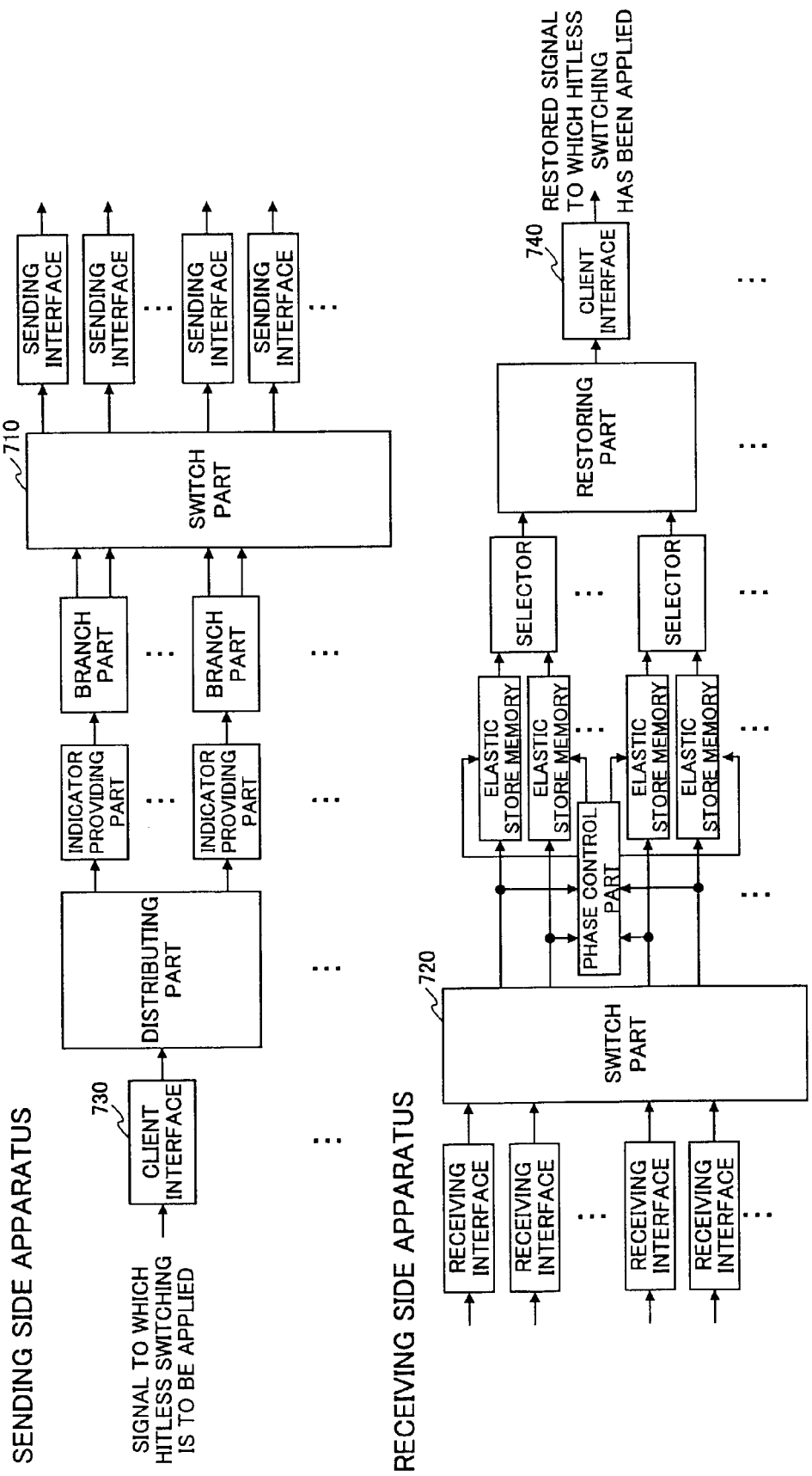

HITLESS SWITCHING SYSTEM AND TRANSMISSION APPARATUS

BACKGROUND OF THE INVENTION

1. Field of the Invention

The present invention relates to a hitless switching system. More particularly, the present invention relates to a hitless switching system for switching between signals transmitted over a plurality of routes in a synchronous digital transmission network including a plurality of nodes that have multiplexing/demultiplexing capability or cross connect capability.

2. Description of the Related Art

For realizing hitless switching, a signal is branched into two signals in the sending side, and the branched signals are sent over two different routes. Branched signals are the same. Then, in the receiving side, one signal is switched to another signal within one bit after aligning phases between the signals.

FIG. 1 shows a block diagram of a transmission system for explaining a conventional hitless switching technology. The system shown in FIG. 1 includes a sending side apparatus and a receiving side apparatus. The sending side apparatus includes an indicator providing part 11, a branch part 12, a first sending interface 13, a second sending interface 14. The receiving side apparatus includes a first receiving interface 15, a second receiving interface 16, a first elastic store memory 17, a second elastic store memory 18, a phase control part 19, and a selector 20. The indicator providing part 11 receives a signal 101 to be switched with no bit error, and a signal 102 that is switched with no bit error is output from the selector 20.

The signal 101 is provided with an indicator used for phase control in the indicator providing part 11. Then, the signal 101 is input into the branch part 12. After that, the signal 101 is branched into the first sending interface 13 and the second sending interface 14. Branched signals are the same. According to this process, sending data is sent to different two routes.

The signal input into the first receiving interface 15 is stored in the first elastic store memory 17. The signal input into the second receiving interface 16 is stored in the second elastic store memory 18.

Phases for reading the signals stored in the first elastic store memory 17 and the second elastic store memory 18 are aligned by the phase control part 19. Then, the signals are received by the selector 20. The selector 20 performs switching within one bit. In the switching, it is decided whether the selector 20 receives a signal from the first elastic store memory 17 or receives a signal from the second elastic store memory 18.

According to this process, hitless switching is realized between signals transmitted over different two routes.

The phase aligning between signals transmitted over different two routes are performed in the following way. The signals are temporarily stored in the elastic store memories. Then, phase difference between the signals is detected by using a specific pattern (indicator) that has been inserted into J1 byte multi-frame or H4 byte multi-frame in each signal at the sending side, wherein each of the J1 byte multi-frame and the H4 byte multi-frame exists in POH in synchronous digital hierarchy defined in ITU-T G.707. By detecting the phase difference, the phases of the signals are aligned for reading from the elastic store memories.

As a technology relating to aligning phases, there is a virtual concatenation technology. In the virtual concatenation, an original signal is divided into a plurality of virtual concatenation signals in the sending side. Then, phases are aligned between signals that are transmitted over the same route or over different routes. After that, the original signal is restored.

FIG. 2 shows a block diagram of a transmission system for explaining the virtual concatenation technology. The system shown in FIG. 2 includes a sending side apparatus and a receiving side apparatus. The sending side apparatus includes a distributing part 31, indicator providing parts $32_1$~$32_n$, sending interfaces $33_1$~$33_n$. The receiving side apparatus includes receiving interfaces $34_1$~$34_n$, elastic store memories $35_1$~$35_n$, a phase control part 36, and a restoring part 37. The distributing part 31 receives a signal 201 to which virtual concatenation is to be applied. The signal 201 is divided and transmitted. Then, a restored signal 202 is output from the restoring part 37.

The signal 201 is divided into a plurality of virtual concatenation signals in the distributing part 31. Then, an indicator used for phase control is provided to each virtual concatenation signal in the indicator providing parts $32_1$~$32_n$. After that, the virtual concatenation signals are input into the sending interfaces $33_1$~$33_n$ so as to be transmitted over the same route or different routes.

The virtual concatenation signals received by the receiving interfaces $34_1$~$34_n$ are stored in the elastic store memories $35_1$~$35_n$.

Phases for reading the virtual concatenation signals stored in the elastic store memories $35_1$~$35_n$ are aligned by the phase control part 36. Then, the virtual concatenation signals are input into the restoring part 37 so that the original signal is restored.

According to this process, virtual concatenation transmission is realized by dividing and restoring the original signal.

The phase aligning between the virtual concatenation signals is performed in the following way. The virtual concatenation signals which are transmitted over the same route or the different routes are temporarily stored in the elastic store memories. Then, phase difference between signals are detected by using a specific pattern (indicator) that has been inserted, at the sending side, into the H4 byte multi-frame in POH of each signal, wherein the H4 byte multi-frame is defined in ITU-T G.707. By detecting the phase difference, the phases of the signals are aligned when reading from the elastic store memories.

In the conventional hitless switching, the size of the original signal to be switched with no bit error is VC-3 (50 Mbit/s), VC-4 (150 Mbit/s) or VC-4-Xc (150×X Mbit/s (X=4, 16, 64, 256)) that is contiguous concatenation that are defined in ITU-T G.707. However, hitless switching for signals of intermediate bandwidth other than VC-3, VC-4 and VC-4-Xc (X=4, 16, 64, 256) has not been realized, so that efficient use of transmission bandwidth has not been realized.

In the conventional hitless switching, if the J1 byte multi-frame is used for detecting phase difference between signals transmitted over different two routes, there is a problem since the J1 byte is defined as a path trace byte used for uniquely detecting a path in the synchronous digital hierarchy in ITU-T G.707. Thus, if hitless switching is performed by using the J1 byte, the path trace can not be realized, so that the hitless switching and the path trace can not be compatible.

Hypothetically, by connecting the conventional hitless switching and virtual concatenation serially, hitless switching for intermediate bandwidth other than VC-3, VC-4, VC-4-Xc (X=4, 16, 64, 256) can be realized. However, in this case, it is necessary to provide a part for detecting phase difference for hitless switching and a part for detecting phase difference for virtual concatenation, in addition, it is necessary to provide elastic store memories for hitless switching and elastic store memories for virtual concatenation. There is a problem in that the configuration of the system becomes complicated and delay increases.

Further in this case, if the H4 byte multi-frame in POH is used for detecting the phase difference, there is a problem in that the H4 byte multi-frame used for hitless switching overwrites the H4 byte multi-frame used for virtual concatenation since the H4 byte is defined as a byte used for detecting phase difference for realizing virtual concatenation. Therefore, in this case, the original signal can not be restored from the divided virtual concatenation signals, so that the hitless switching and the virtual concatenation can not be compatible.

In addition, in the case in which conventional hitless switching and virtual concatenation are connected serially, if J1 byte multi-frame is used for detecting phase difference between signals transmitted over two different routes, there is a problem in that path trace can not be performed for virtual concatenation signals since the J1 byte used for hitless switching overwrites the J1 byte used for path trace. Thus, there is a problem in that the hitless switching and path trace can not be compatible.

SUMMARY OF THE INVENTION

An object of the present invention is to provide a hitless switching system and a transmission apparatus, without increasing complexity of the system and the apparatus, to support signals of large capacity accompanying increase of recent LAN traffic, and to support signals of intermediate bandwidth corresponding to virtual concatenations such as VC-3-Xv (50×X Mbit/s (X is an integer of 1~256)) and VC-4-Xv (150×X Mbit/s (X is an integer of 1~256)) other than VC-3, VC-4 and VC-4-Xc(X is 4, 16, 64 or 256).

The above-mentioned object is achieved by a hitless switching system for switching between signals transmitted over a plurality of transmission lines, the hitless switching system including a sending apparatus and a receiving apparatus, the sending apparatus including:

a distributing part for dividing an original signal into a plurality of signals; and a transmitting part for transmitting the divided signals over one or a plurality of transmission lines with redundancy, the receiving apparatus including:

a phase difference detection part for detecting phase difference between signals sent from the sending apparatus;

a phase difference absorbing part for absorbing the phase difference detected by the phase difference detection part;

selectors each of which selects one signal from a plurality of signals in which phases are aliened; and a restoring part for restoring the original signal from signals output from the selectors.

According to this invention, the original signal is divided into n signals for example, and 2n branched signals, for example, are sent to a receiving side over transmission lines. Then, switching is performed after phase differences of the 2n signals are absorbed. Therefore, absorption of phase differences for dividing and restoring signals and for redundancy switching can be carried out at a time. In addition, since the original signal is divided into n signals, hitless switching of intermediate bandwidth can be realized.

In the above-mentioned hitless switching system, the sending apparatus further includes branch parts each of which branches one of the divided signals into a first signal and a second signal, wherein the transmitting part transmits first signals and second signals, the receiving apparatus aligns phases of the first signals and the second signals, and provides the first signals and the second signals to the selectors.

In addition, in the above-mentioned hitless switching system, the hitless switching system includes, in place of the selectors and the restoring part:

restoring parts for restoring a plurality of original signals from signals after the phase difference is absorbed by the phase difference absorbing part; and a selector for selects one original signal from the original signals.

According to this invention, since switching is performed after restoring the original signals, only one selector suffices.

In the above-mentioned hitless switching system, the sending apparatus further includes:

a plurality of branch parts each of which branches one of the signals divided by the distributing part into a first signal and a second signal; and a selector for selecting a second signal from a plurality of second signals output from the branch parts;

wherein the transmitting part transmits the selected second signal and a plurality of first signals, and the receiving apparatus aligns phases of the selected second signal and the first signals, branches the selected second signal into a plurality of second signals, and supplies the second signals and the first signals to the selectors.

According to this invention, for example, a protection transmission line (transmitting second signal) can be commonly used by a plurality of working transmission lines (transmitting first signal), so that communication resources can be used effectively.

In addition, in the above-mentioned hitless switching system, the distributing part includes:

a part for dividing the original signal into virtual concatenation signals by using virtual concatenation technology; and a part for inserting H4 byte multi-frame into each virtual concatenation signal;

wherein the phase difference detection part detects the phase difference by using the H4 byte multi-frame, and the phase difference absorbing part absorbs the phase difference by using elastic store memories.

According to this invention, by using virtual concatenation technology, hitless switching can be realized for supporting signals of intermediate bandwidth corresponding to virtual concatenations such as VC-3-Xv (50×X Mbit/s (X is an integer of 1~256)) and VC-4-Xv (150×X Mbit/s (X is an integer of 1~256)) other than VC-3, VC-4 and VC-4-Xc(X is 4, 16, 64 or 256).

In addition, by using H4 byte multi-frame in virtual concatenation as an indicator for hitless switching and by using elastic store memory for phase alignment, phase alignment for hitless switching and phase alignment for virtual concatenation can be performed at the same time. Thus, it can be avoided that complexity of the apparatuses in the system increases and increase of delay can be avoided. In addition, virtual concatenation can be compatible with hitless switching, and path trace by J1 byte can be compatible with hitless switching.

The above object is also achieved by a transmission apparatus for switching between signals transmitted over transmission lines, the transmission apparatus including:

a receiving part for receiving virtual concatenation signals, wherein the virtual concatenation signals are obtained by dividing an original signal into virtual concatenation signals each of which is further branched to a plurality of virtual concatenation signals, or, by branching an original signal into a plurality of signals each of which are divided into a plurality of virtual concatenation signals;

a phase difference detection part for detecting phase differences among virtual concatenation signals received by the receiving part;

a phase difference absorbing part for absorbing phase differences detected by the phase difference detection part;

selectors each of which selects a virtual concatenation signal from virtual concatenation signals in which phases are aligned;

a restoring part for restoring the original signal from virtual concatenation signals each of which is output from the selectors.

The transmission apparatus includes, instead of the selectors and the restoring part:

a plurality of restoring parts each of which restores the original signal from virtual concatenation signals in which phases are aligned;

a selector for selecting one original signals from a plurality of original signals.

In addition, in the transmission apparatus, the transmission apparatus includes a branch part for branching one virtual concatenation signal of the received virtual concatenation signals into a plurality of virtual concatenation signals that are supplied to the selectors.

BRIEF DESCRIPTION OF THE DRAWINGS

Other objects, features and advantages of the present invention will become more apparent from the following detailed description when read in conjunction with the accompanying drawings, in which:

FIG. 9 shows an example of a system including cross connect apparatuses with the hitless switching capability of the present invention.

DETAILED DESCRIPTION OF THE PREFERRED EMBODIMENTS

In the following, embodiments of the hitless switching system according to the present invention will be described with reference to figures. The hitless switching system in the embodiments of the present invention is an example of a synchronous digital transmission system having capabilities of synchronous digital hierarchy and virtual concatenation defined in ITU-T G.707.

The virtual concatenation technology in the embodiments and H4 byte multi-frame used for detecting phase difference of the virtual concatenation signals are defined in ITU-T G.707.

[Principle of the Embodiments]

Figure 1:
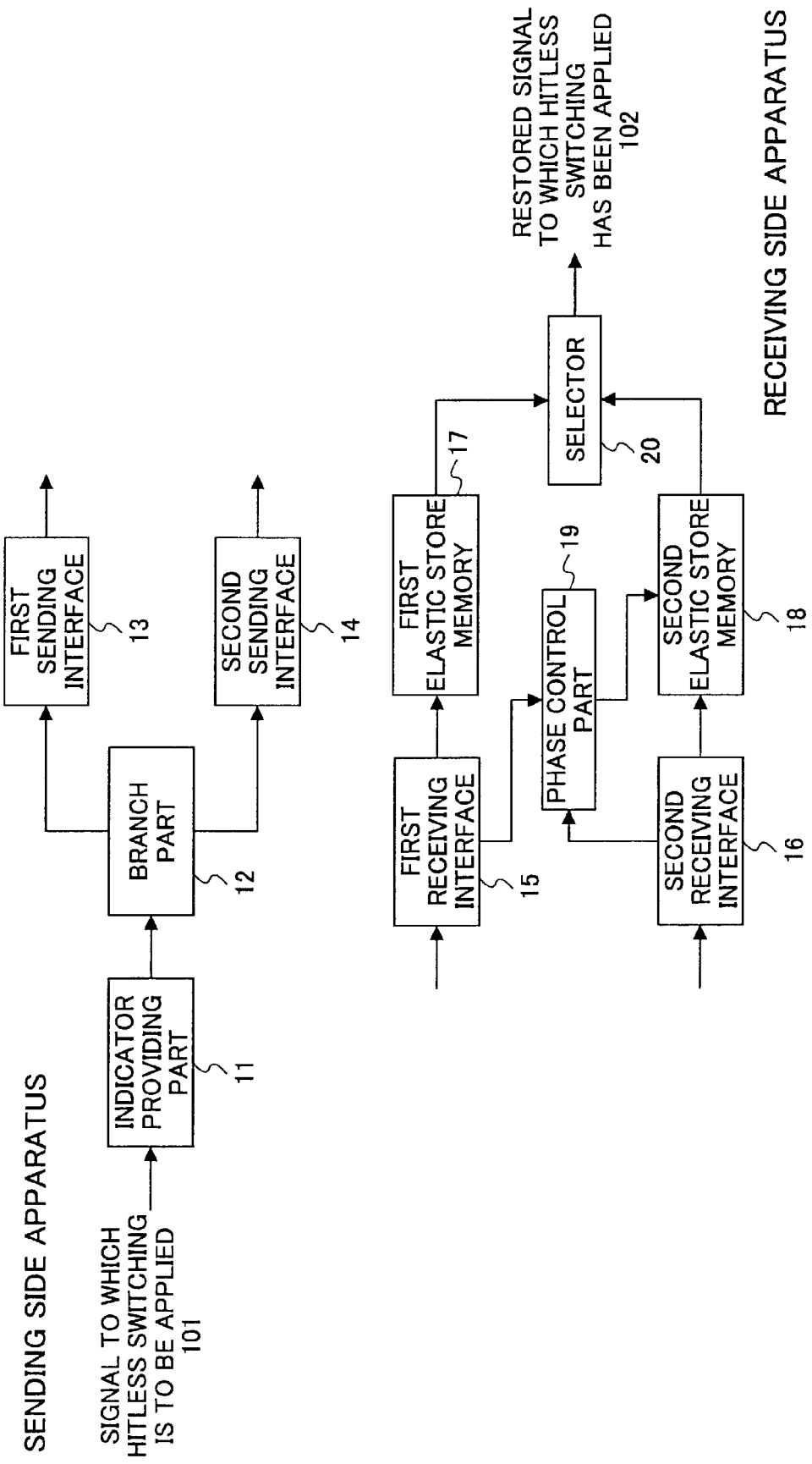
FIG. 1 shows a block diagram of a transmission system for explaining a conventional hitless switching technology.
Figure 2:
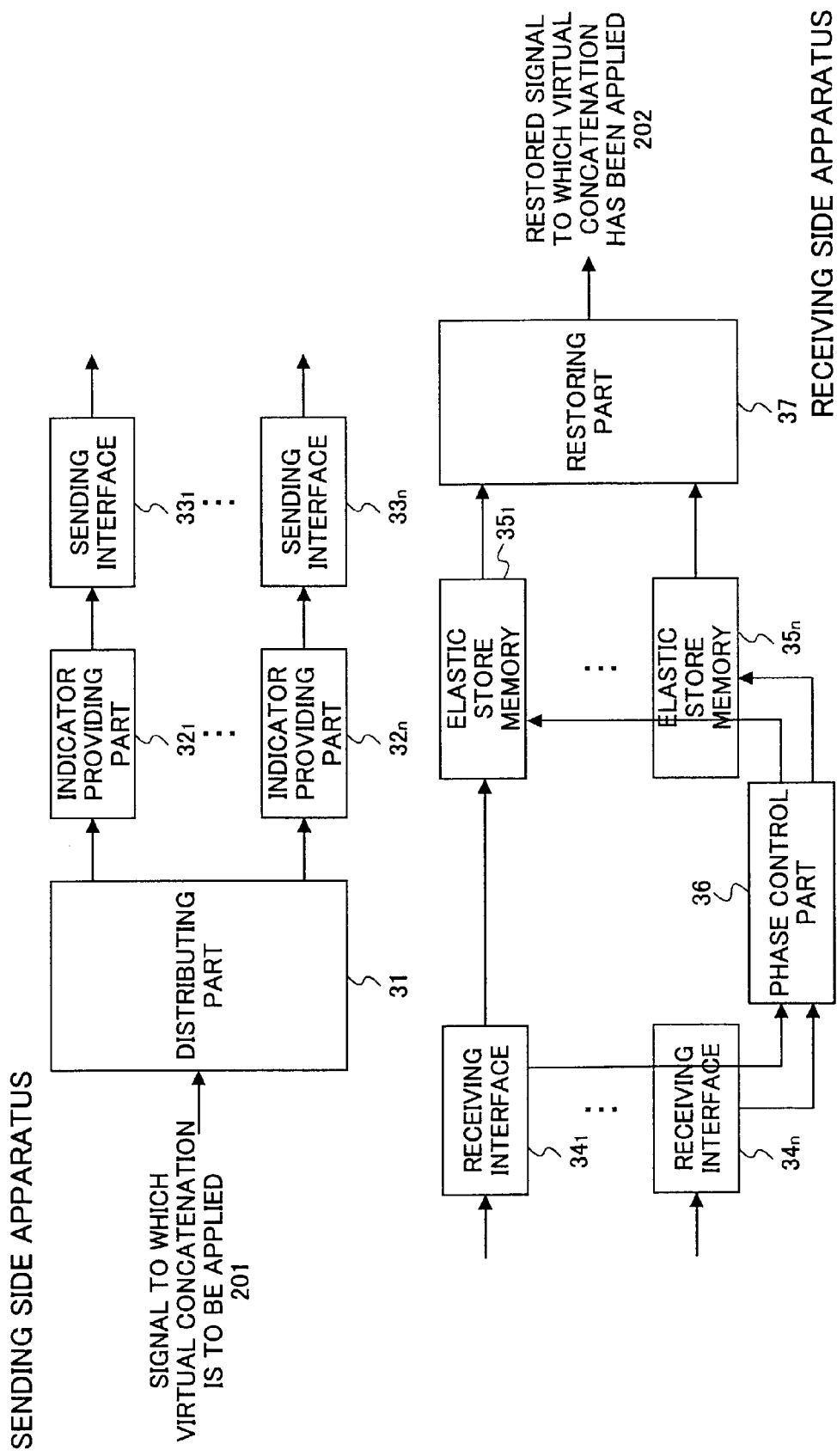
FIG. 2 shows a block diagram of a transmission system for explaining virtual concatenation technology.
Figure 3:
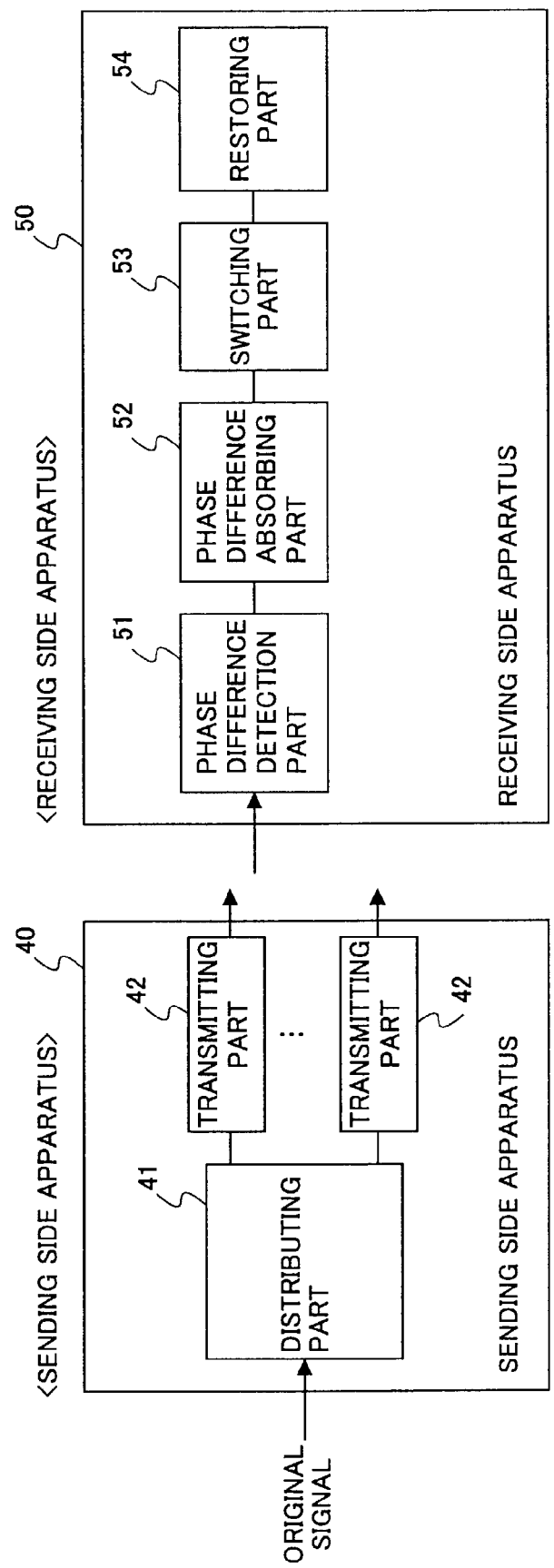
FIG. 3 shows a principle block diagram of the hitless switching system according to an embodiment of the present invention.

FIG. 3 shows a principle block diagram of the hitless switching system according to the Embodiments of the present invention.

The hitless switching system includes a sending side apparatus 40 and a receiving side apparatus 50. The sending side apparatus 40 includes a distributing part 41, transmitting parts 42. The distributing part 41 divides an original signal into a plurality of signals. The transmitting parts 42 transmits the divided signals over one route or a plurality of routes. The receiving side apparatus 50 includes a phase difference detection part 51, a phase difference absorbing part 52, a switching part 53, and a restoring part 54. The phase difference detection part 51 detects phase difference between signals transmitted over one route or over a plurality of routes. The phase difference absorbing part 52 absorbs phase difference detected by the phase difference detection part 51. The switching part 53 switches between signals with no bit error. The restoring part 54 restores the original signal from the divided signals.

FIRST EMBODIMENT

Figure 4:
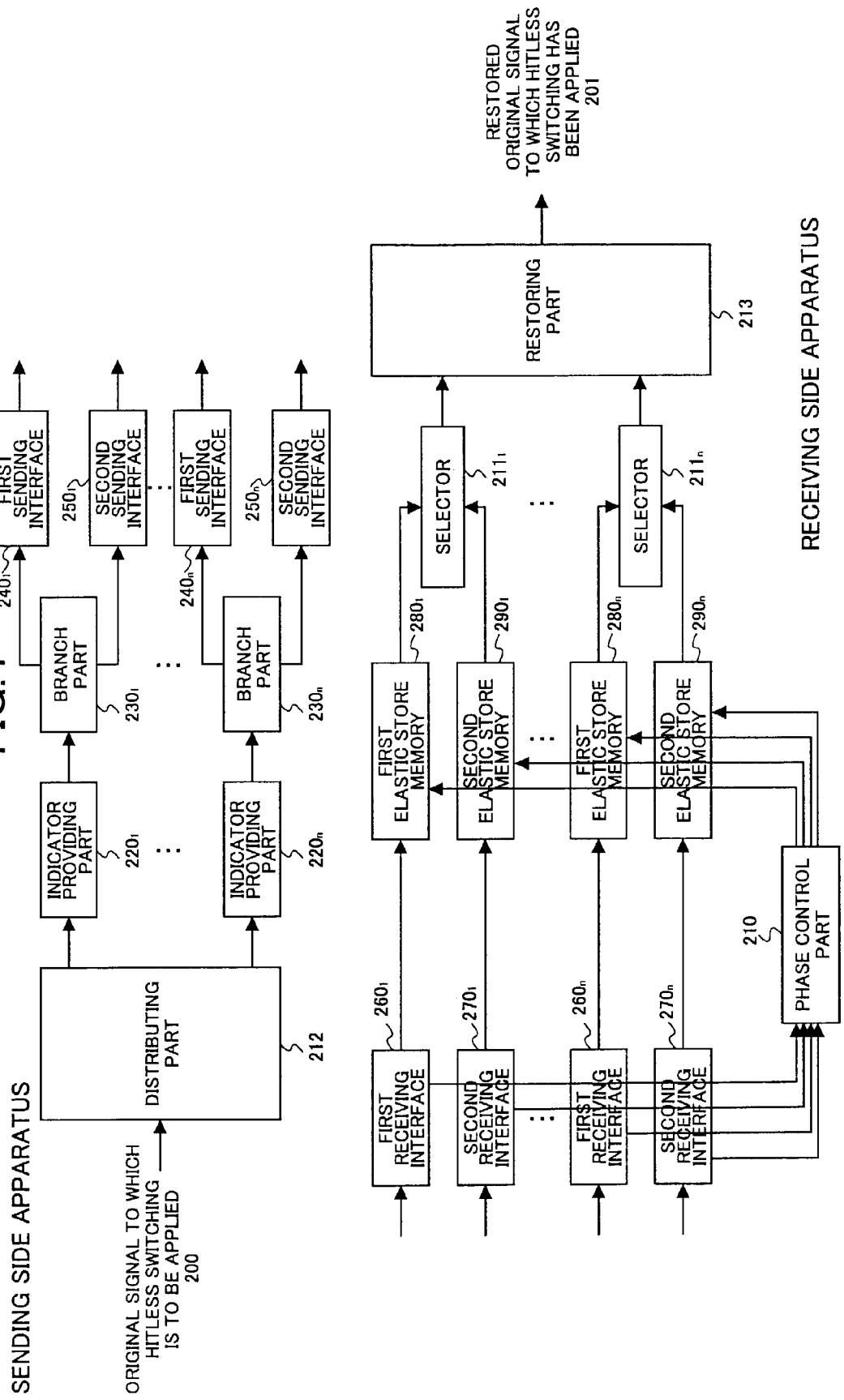
FIG. 4 is a block diagram of the hitless switching system according to the first embodiment of the present invention.

FIG. 4 is a block diagram of the hitless switching system according to the first embodiment of the present invention. The configuration shown in the figure is for realizing hitless switching function using virtual concatenation defined-in ITU-T G.707.

In the system shown in FIG. 4, the sending side apparatus includes a distributing part 212, indicator providing parts $220_1$~$220_n$, branch parts $230_1$~$230_n$, first sending interfaces $240_1$~$240_n$, and second sending interfaces $250_1$~$250_n$. The distributing part 212 divides the original signal into a plurality of virtual concatenation signals defined in ITU-T G.707. Each of the indicator providing parts $220_1$~$220_n$ provides H4 byte multi-frame to the virtual concatenation signal for detecting phase difference between virtual concatenation signals. Each of the branch parts $230_1$~$230_n$ branches the virtual concatenation signal into two systems. Each of the first sending interfaces $240_1$~$240_n$ transmits one of the branched virtual concatenation signals to a first transmission line. Each of the second sending interfaces $250_1$~$250_n$ transmits one of the branched virtual concatenation signals to a second transmission line. The first transmission lines and the second transmission lines can be one route or a plurality of routes. This applies also to other Embodiments.

The receiving side apparatus of the hitless switching system includes first receiving interfaces $260_1$~$260_n$ for receiving virtual concatenation signals from first transmission lines, second receiving interfaces $270_1$~$270_n$ for receiving virtual concatenation signals from the second transmission lines, first elastic store memories $280_1$~$280_n$, second elastic store memories $290_1$~$290_n$, a phase control part 210, selectors $211_1$~$211_n$, and a restoring part 213. The selectors $211_1$~$211_n$ corresponds to the switching part 53 in FIG. 3.

The first elastic store memories $280_1$~$280_n$ are for temporarily storing virtual concatenation signals received from the first transmission lines. The second elastic store memories $290_1$~$290_n$ are for temporarily storing virtual concatenation signals received from the second transmission lines. The phase control part 210 detects phase difference between virtual concatenation signals that are transmitted over different routes and aligns phases for reading virtual concatenation signals from each elastic store memory. Each of the selectors $211_1$~$211_n$, performs switching between a virtual concatenation signal received from the first transmission line and a virtual concatenation signal received from the second transmission line. The restoring part 213 restores the original signal from the virtual concatenation signals in conformity with ITU-T G.707.

Next, operation of the hitless switching system of this embodiment will be described with reference to FIG. 4.

The original signal 200 to which hitless switching is to be applied is received by the distributing part 212. The distributing part 212 divides the original signal into a plurality of virtual concatenation signals. After that, each of the indicator providing part $220_1$~$220_n$ writes a specific pattern (indicator) in the H4 byte multi-frame of the virtual concatenation signal, in which the specific pattern is used for detecting phase difference for restoring the divided signals into the original signal and is used for detecting phase difference for hitless switching, however, the phase differences are not distinguished. According to this process, the original signal is divided into the virtual concatenation signals. For example, the original signal (A) is divided into n signals which can be represented as A1, A2, ... , An. A1 is sent to the indicator providing part $220_1$. An is sent to the indicator providing part $220_n$.

Next, each of the virtual concatenation signals from the indicator providing part $220_1$~$220_n$ is branched into two different systems by the branch part $230_1$~$230_n$. One of the branched signals is sent to the first transmission line by corresponding one of the first sending interfaces $240_1$~$240_n$. Another one of the branched signals is sent to the second transmission line by corresponding one of the second sending interfaces $250_1$~$250_n$.

The virtual concatenation signals sent over the first transmission lines are transmitted to the first receiving interfaces $260_1$~$260_n$, via the synchronous digital transmission network. In the same way, the virtual concatenation signals sent over the second transmission lines are transmitted to the second receiving interfaces $270_1$~$270_n$, via the synchronous digital transmission network.

Each signal sent from the first sending interface is the same as the signal sent from the corresponding second sending interface.

In the receiving side, the first receiving interfaces $260_1$~$260_n$ receive virtual concatenation signals sent over the first transmission lines, and the second receiving interfaces $270_1$~$270_n$ receive virtual concatenation signals sent over the second transmission lines. The virtual concatenation signals received from the first transmission lines are temporarily stored in the first elastic store memories $280_1$, $280_n$, and the virtual concatenation signals received from the second transmission lines are temporarily stored in the second elastic store memories $290_1$~$290_n$. After that, the phase control part 210 detects phase differences on the basis of the specific pattern (indicator) written in the H4 byte multi-frame. Then, after phases for reading the virtual concatenation signals from the elastic store memories are aligned, the virtual concatenation signals are sent to the selectors $211_1$~$211_n$. In each of the selectors $211_1$~$211_n$, switching of selection system is performed within one bit between the virtual concatenation signal received from the first transmission line and the virtual concatenation signal received from the second transmission line. The switching means that each of the selectors $211_1$~$211_n$ selects between receiving a signal from the first elastic store memory or receiving a signal from the second elastic store memory.

The virtual concatenation signals in which switching of selection system is performed by the selectors $211_1$~$211_n$ are sent to the restoring part 213, so that the original signal is restored.

By the above-mentioned process in which the selector performs switching of selection system within one bit after the phases between virtual concatenation signals are aligned, phase alignment for hitless switching and phase alignment for virtual concatenation are performed simultaneously, and the original signal is restored without no bit error.

In this embodiment, although a plurality of selectors are necessary since switching is performed before restoring the original signal, there is an advantage in that only particular signals for which switching is necessary can be switched.

In this embodiment, one branch part is provided to each virtual concatenation signal in the sending side, and one selector is provided to each virtual concatenation signal in the receiving side. However, the branch parts $230_1$~$230_n$ can be replaced by a switch for branching the virtual concatenation signals. In addition, the selectors $211_1$~$211_n$ can be replaced by a switch for selecting between virtual concatenation signals.

SECOND EMBODIMENT

In the first embodiment, the branch part 230 is located after the distributing part 212 in the sending side, and the selector 211 is located before the restoring part 213. The hitless switching can be also realized by a configuration in which the original signal is branched into two systems before dividing into virtual concatenation signals in the sending side, and switching is performed after restoring the original signal.

In this embodiment, a hitless switching system in which placement of the branch part and the selector are changed will be described with reference to FIG. 5.

Figure 5:
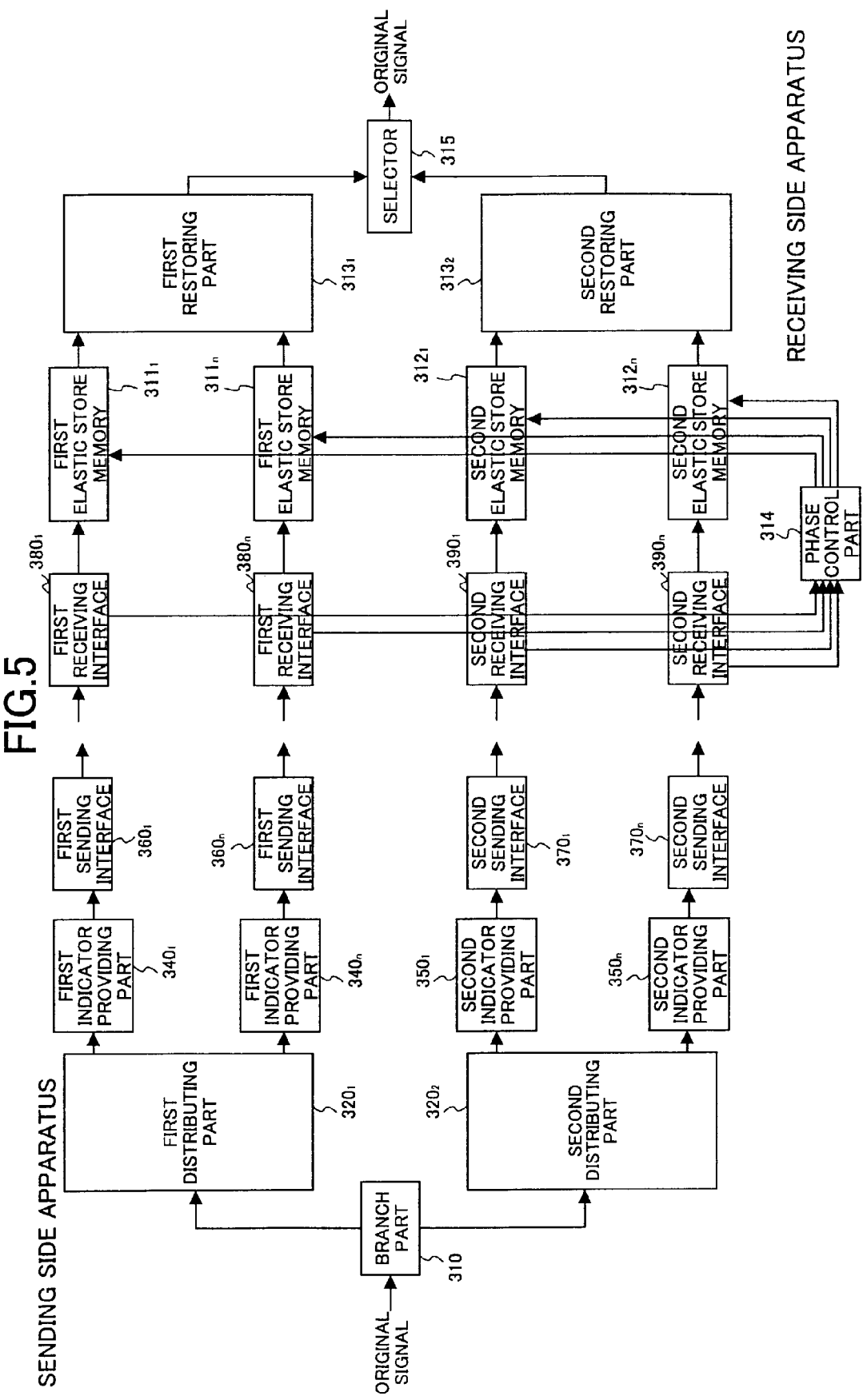
FIG. 5 is a block diagram of the hitless switching system according to the second embodiment of the present invention.

FIG. 5 is a block diagram of the hitless switching system according to the second embodiment of the present invention.

In the system shown in FIG. 5, the sending side apparatus includes a branch part 310, a first distributing part $320_1$, a second distributing part $320_2$, first indicator providing parts $340_1$~$340_n$, second indicator providing parts $350_1$~$350_n$, first sending interfaces $360_1$~$360_n$, and second sending interfaces $370_1$~$370_n$.

The branch part 310 branches the original signal into two systems. The first distributing part $320_1$ divides one original signal in the branched original signals (which will be referred to as first original signal in the following) into a plurality of virtual concatenation signals according to the standard of virtual concatenation defined in ITU-T G.707. The second distributing part $320_2$ divides another original signal (which will be referred to as second original signal in the following) into a plurality of virtual concatenation signals according to the standard of virtual concatenation defined in ITU-T G.707. Each of the first indicator providing parts $340_1$~$340_n$ provides H4 byte multi-frame to the virtual concatenation signal divided from the first original signal for detecting phase difference between virtual concatenation signals. Each of the second indicator providing parts $350_1$~$350_n$ provides H4 byte multi-frame to the virtual concatenation signal divided from the second original signal for detecting phase difference between virtual concatenation signals. The phase difference includes phase difference caused by dividing the original signal into virtual concatenation signals and sending the virtual concatenation signals and phase difference caused by sending the virtual concatenation signals over different routes. Each of the first sending interfaces $360_1$~$360_n$ transmits one of the divided virtual concatenation signals divided from the first original signal to a first transmission line. Each of the second sending interfaces $370_1$~$370_n$ transmits one of the divided virtual concatenation signals divided from the second original signal to a second transmission line.

The receiving side apparatus of the hitless switching system includes first receiving interfaces $380_1$~$380_n$ for receiving virtual concatenation signals from first transmission lines, second receiving interfaces $390_1$~$390_n$ for receiving virtual concatenation signals from the second transmission lines, first elastic store memories $311_1$~$311_n$, second elastic store memories $312_1$~$312_n$, a phase control part 314, a first restoring part $313_1$, a second restoring part $313_2$, and a selector 315.

The first elastic store memories $311_1$~$311_n$ are for temporarily storing virtual concatenation signals received from the first transmission lines. The second elastic store memories $312_1$~$312_n$ are for temporarily storing virtual concatenation signals received from the second transmission lines. The phase control part 314 detects phase differences among all virtual concatenation signals and aligns phases for reading virtual concatenation signals from each elastic store memory. The first restoring part $313_1$ restores the first original signal from the virtual concatenation signals read from the first elastic store memories $311_1$~$311_n$. The second restoring part $313_2$ restores the second original signal from the virtual concatenation signals read from second elastic store memories $312_1$~$312_n$. The selector 315 performs switching between the first original signal and the second original signal.

Next, operation of the hitless switching system of this embodiment will be described with reference to FIG. 5.

The original signal 200 to which hitless switching is to be applied is received by the dividing part 310. Then, the original signal is branched into the first original signal and the second original signal. After that, the first original signal is received by the first distributing part $320_1$, and the second original signal is received by the second distributing part $320_2$. The first original signal and the second original signal are the same. The first distributing part $320_1$ divides the first original signal into a plurality of virtual concatenation signals. After that, each of the first indicator providing part $340_1$~$340_n$ writes a specific pattern (indicator) in the H4 byte multi-frame of the virtual concatenation signal, in which the specific pattern is used for detecting phase difference for restoring the divided signals into the original signal and is used for detecting phase difference for hitless switching. Then, the virtual concatenation signals are sent to the first transmission lines from the first sending interfaces $360_1$~$360_n$.

The second distributing part $320_2$ divides the second original signal into a plurality of virtual concatenation signals. After that, each of the second indicator providing part $350_1$~$350_n$ writes a specific pattern (indicator) in the H4 byte multi-frame of the virtual concatenation signal, in which the specific pattern is used for detecting phase difference for restoring the divided signals into the original signal and is used for detecting phase difference for hitless switching. Then, the virtual concatenation signals are sent to the second transmission lines from the second sending interfaces $370_1$~$370_n$.

According to this process, the original signal is divided into the first virtual concatenation signals and second virtual concatenation signals.

In the receiving side, the first receiving interfaces $380_1$~$380_n$ receive the first virtual concatenation signals sent over the first transmission lines, and the second receiving interfaces $390_1$~$390_n$ receive the second virtual concatenation signals sent over the second transmission lines. The first virtual concatenation signals received from the first transmission lines are temporarily stored in the first elastic store memories $311_1$~$311_n$, and the second virtual concatenation signals received from the second transmission lines are temporarily stored in the second elastic store memories $312_1$~$312_n$. After that, the phase control part 314 detects phase differences among all virtual concatenation signals on the basis of the specific pattern (indicator) written in the H4 byte multi-frame, so that phases for reading the virtual concatenation signals are aligned.

Then, after phases for reading the virtual concatenation signals from the elastic store memories are aligned, the first virtual concatenation signals are sent to the first restoring part $313_1$, so that the first original signal is restored. The first original signal is sent to the selector 315. The second virtual concatenation signals are sent to the second restoring part $313_2$, so that the second original signal is restored. The second original signal is sent to the selector 315.

The selector 315 performs switching of selection system within one bit between the first original signal and the second original signal.

By the above-mentioned process in which the first original signal and the second original signal are restored and the selector performs switching of selection system within one bit after the phases between virtual concatenation signals are aligned, phase alignment for hitless switching and phase alignment for virtual concatenation are performed simultaneously, and the original signal is switched without no bit error.

Hitless switching can be also realized by a combination of the sending side apparatus of the first embodiment and the receiving side apparatus of the second embodiment, or a combination of the sending side apparatus of the second embodiment and the receiving side apparatus of the first embodiment.

In the second embodiment, since switching is performed after restoring process is performed in each of the first system (working system) and the second system (protection system), one selector suffices for the hitless switching. Therefore, in the operation of switching, only one selector needs to be operated, so that there is an advantage in that there is no complicated procedure for operating a plurality of selectors.

THIRD EMBODIMENT

In the above-mentioned first and second Embodiments, redundancy is realized by using the first system and the second system for every virtual concatenation signal divided from the original signal. In this third embodiment, the second transmission line is commonly used by a plurality of first transmission lines. Signals are sent to the first sending interfaces and one of the signal is also sent to the second sending interface. According to this embodiment, signals can be transmitted efficiently by using one second sending interface and a plurality of first sending interfaces.

Figure 6:
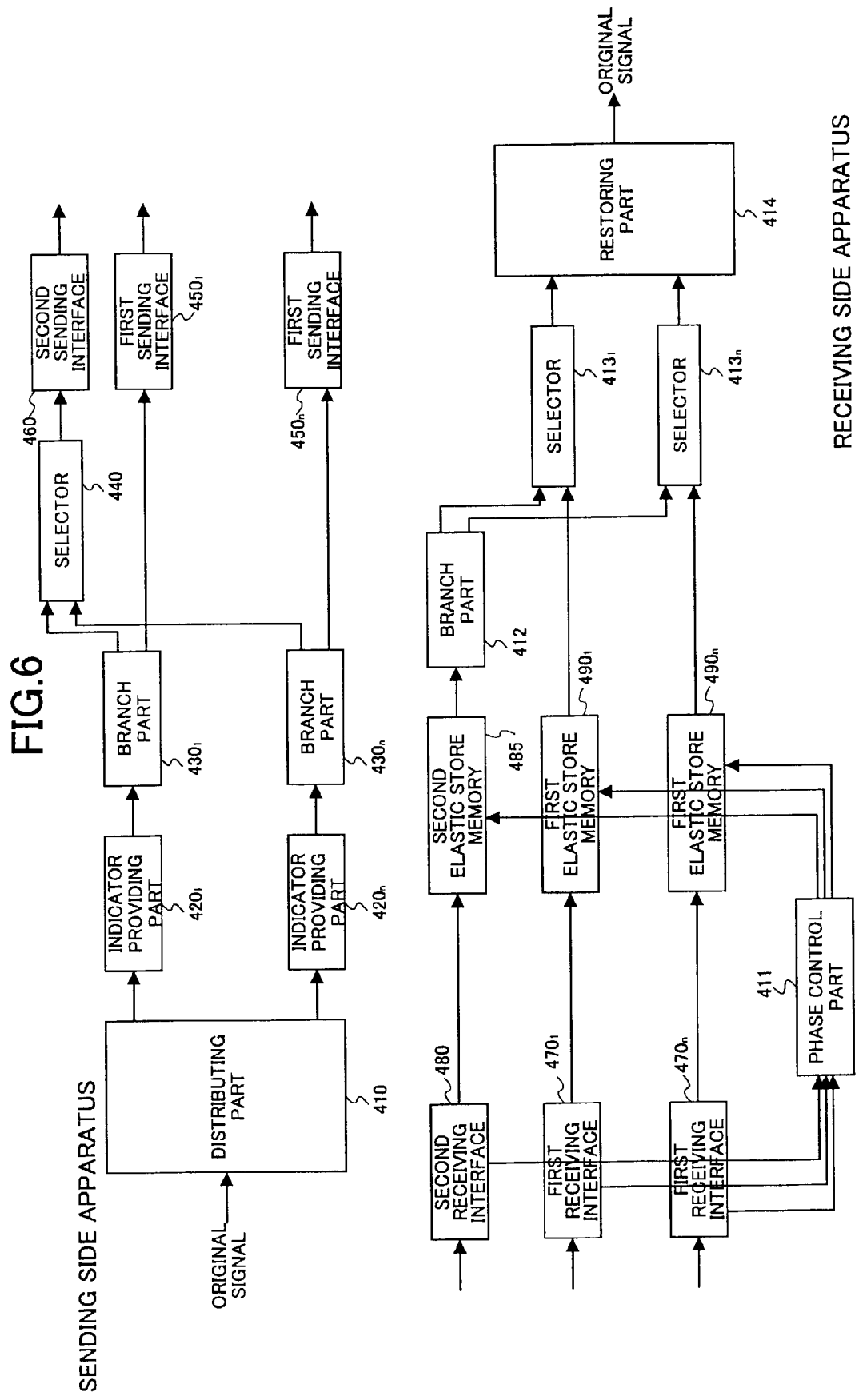
FIG. 6 is a block diagram of the hitless switching system according to the third embodiment of the present invention.

FIG. 6 is a block diagram of the hitless switching system according to the third embodiment of the present invention. The configuration shown in the figure is for realizing hitless switching function using virtual concatenation defined in ITU-T G.707.

In the system shown in FIG. 6, the sending side apparatus includes a distributing part 410, indicator providing parts $420_1$~$420_n$, branch parts $430_1$~$430_n$, a selector 440, a first sending interfaces $450_1$~$450_n$, and a second sending interface 460. The distributing part 410 divides the original signal into a plurality of virtual concatenation signals defined in ITU-T G.707. Each of the indicator providing parts $420_1$~$420_n$ provides H4 byte multi-frame to the virtual concatenation signal for detecting phase difference between virtual concatenation signals, in which the phase difference includes phase difference caused by dividing the original signals into virtual concatenation signals and sending the virtual concatenation signals and phase difference caused by sending the virtual concatenation signals over different routes. Each of the branch parts $430_1$~$430_n$ branches the virtual concatenation signal into a first virtual concatenation signal and a second virtual concatenation signal. The selector 440 selects a second virtual concatenation signal used for hitless switching from a plurality of second virtual concatenation signals. Each of the first sending interfaces $450_1$~$450_n$ transmits one of the divided virtual concatenation signals to a first transmission line. The second sending interface 460 transmits the second virtual concatenation signal to a second transmission line.

The receiving side apparatus of the hitless switching system includes first receiving interfaces $470_1$~$470_n$ for receiving first virtual concatenation signals from first transmission lines, a second receiving interface 480 for receiving a second virtual concatenation signal from the second transmission line, first elastic store memories $490_1$~$490_n$, a second elastic store memory 485, a phase control part 411, a branch part 412, selectors $413_1$~$413_n$, and a restoring part 414.

The first elastic store memories $490_1$~$490_n$ are for temporarily storing the first virtual concatenation signals received from the first transmission lines. The second elastic store memory 480 is for temporarily storing the second virtual concatenation signal received from the second transmission line. The phase control part 411 detects phase differences among all virtual concatenation signals that are transmitted over different routes and aligns phases for reading signals from each elastic store memory. The branch part 412 is for branching the second virtual concatenation signal into a plurality of second virtual concatenation signals. Each of the selectors $413_1$~$413_n$ performs switching between the first virtual concatenation signal and the second virtual concatenation signal. The restoring part 414 restores the original signal from the selected virtual concatenation signals.

Next, operation of the hitless switching system of this embodiment will be described with reference to FIG. 6.

The original signal 410 to which hitless switching is to be applied is received by the distributing part 410. The distributing part 410 divides the original signal into a plurality of virtual concatenation signals. After that, each of the indicator providing part $420_1$~$420_n$ writes a specific pattern (indicator) in the H4 byte multi-frame of the virtual concatenation signal. According to this process, the original signal is divided into the virtual concatenation signals.

Next, each of the virtual concatenation signals from the indicator providing parts $420_1$~$420_n$ is branched into the first virtual concatenation signal and the second virtual concatenation signal by the branch parts $430_1$~$430_n$. The branched first virtual concatenation signals are sent to the first sending interfaces $450_1$~$450_n$. The branched second virtual concatenation signals are sent to the selector 440. The selector 440 selects a virtual concatenation signal that is to be used for hitless switching from a plurality of second virtual concatenation signals. The selected second virtual concatenation signal is sent to the second sending interface 460.

In the receiving side, the first receiving interfaces $470_1$~$470_n$ receive the first virtual concatenation signals, and the second receiving interface 480 receives the second virtual concatenation signal. The first virtual concatenation signals are temporarily stored in the first elastic store memories $490_1$~$490_n$, and the second virtual concatenation signal is temporarily stored in the second elastic store memory 485. After that, the phase control part 411 detects phase differences on the basis of the specific pattern (indicator) written in the H4 byte multi-frame.

Then, after phases for reading the virtual concatenation signals from the elastic store memories are aligned, the first virtual concatenation signals are sent to the selectors $413_1$~$413_n$. The second virtual concatenation signal is sent to the branch part 412 and branched and sent to each of the selectors $413_1$~$413_n$.

In each of the selectors $413_1$~$413_n$ that receives the first and second virtual concatenation signals, switching of selection system is performed within one bit between the first virtual concatenation signal and the second virtual concatenation signal. The virtual concatenation signals in which switching of selection system is performed by the selectors $413_1$~$413_n$ are sent to the restoring part 414, so that the original signal is restored.

A selector that receives a first virtual concatenation signal other than a first virtual concatenation signal to be switched fixes the selector to avoid erroneous switching, so that it sends the received first virtual concatenation signal to the restoring part 414. The restoring part 414 restores the original signal from the input virtual concatenation signals.

By the above-mentioned process in which the selectors perform switching of selection system within one bit after the phases between the first and second virtual concatenation signals are aligned, phase alignment for hitless switching and phase alignment for virtual concatenation are performed simultaneously, and the original signal is restored with no bit error.

In this embodiment, the transmission line between the second sending interface and the second receiving interface (protection transmission line for hitless switching) is commonly used for the transmission lines between the first sending interfaces and the first receiving interfaces (working transmission line), the transmission lines (bandwidth) can be used efficiently. That is, assuming that m=(the number of working transmission lines) and n=(the number of protection transmission lines), by configuring the hitless switching system such that m>n is satisfied, transmission lines of m-n can be used for other purposes.

The specific pattern used for detecting phase differences for hitless switching in the first to third Embodiments is H4 byte 4096 multi-frame used for detecting phase differences among a plurality of virtual concatenation signals in virtual concatenation defined in ITU-T G.707. The elastic store memories for aligning virtual concatenation signals transmitted over different routes are elastic store memories for aligning phases among a plurality of virtual concatenation signals.

The present invention is a hitless switching system in which switching among signals sent over a plurality of different routes. The number of routes over which the divided virtual concatenation signals are sent is not limited to two. The virtual concatenation signals can be transmitted over a plurality of different routes.

In the first to third Embodiments, the hitless switching system is based on a synchronous digital transmission system having synchronous digital hierarchy and virtual concatenation capability defined by ITU-T G.707 as an example. The hitless switching system of the present invention can be also configured by including multiplexers, cross connect apparatuses and add-drop multiplexers and the like.

Figure 7:
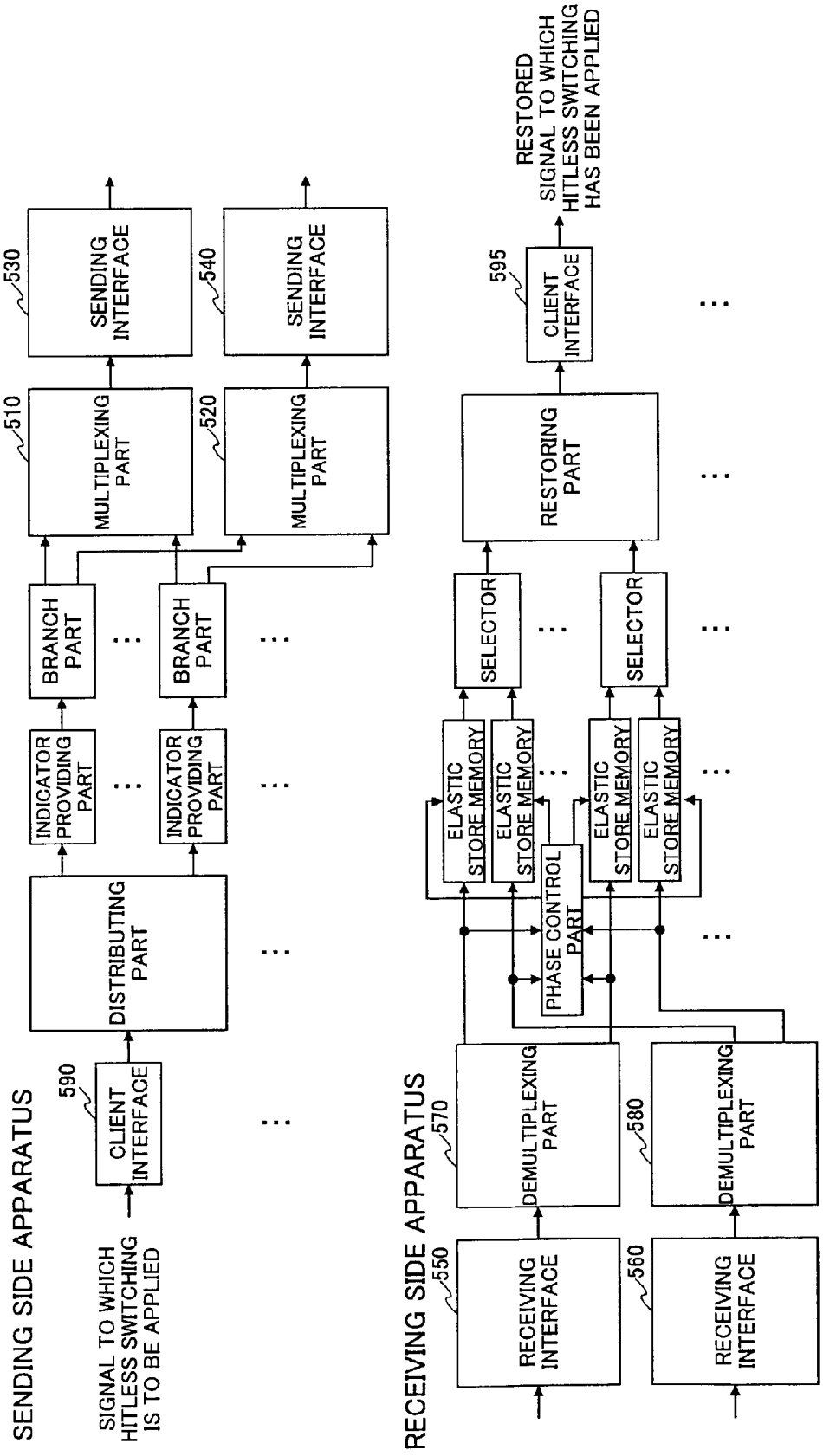
FIG. 7 shows an example of a system including multiplexers with the hitless switching capability of the present invention.
Figure 8:
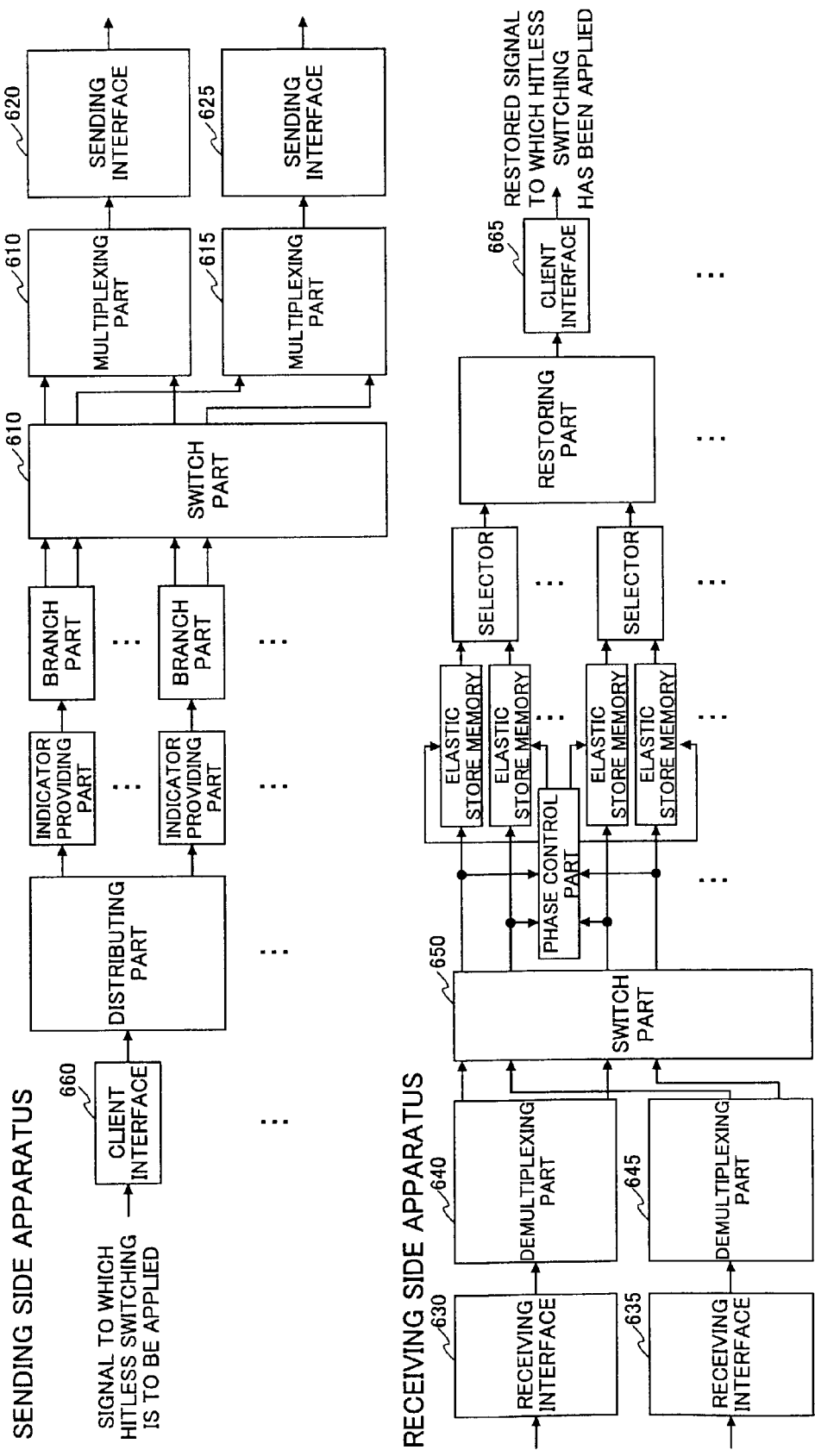
FIG. 8 shows an example of a system including add-drop multiplexers with the hitless switching capability of the present invention.

FIGS. 7-9 shows a multiplexer, an add-drop multiplexer and a cross connect apparatus as an example of a transmission apparatus having the hitless switching capability of the present invention.

FIG. 7 shows an example of a system including multiplexers with the hitless switching capability. The multiplexer in the sending side includes multiplexing parts 510 and 520 and sending interfaces 530 and 540 in place of the sending interfaces 240 and 250 in the first embodiment. In addition, the multiplexer includes a client interface 590 for receiving a client signal. In the multiplexer, signals branched by the branch parts are multiplexed in the multiplexing parts 510 and 520, and output from the sending interfaces 530 and 540.

The multiplexer (demultiplexer) in the receiving side includes receiving interfaces 550 and 560 and demultiplexing parts 570 and 580 in place of the receiving interfaces 260 and 270 in the first embodiment. In addition, it includes a client interface 595 for outputting the client signal. In the multiplexer in the receiving side, signals sent from the sending interfaces 530 and 540 are received by the receiving interfaces 550 and 560, and the demultiplexing parts 570 and 580 demultiplexes the multiplexed signals. Processes for hitless switching are the same as those of the first embodiment.

FIG. 8 shows an example of a system including add-drop multiplexers with the hitless switching capability of the present invention. The add-drop multiplexer in the sending side includes a SW (switching) part 600, multiplexing parts 610, 615 and sending interfaces 620, 625 in place of the sending interfaces 240 and 250 in the first embodiment. In addition, the add-drop multiplexer includes a client interface 660 for receiving a client signal. In the add-drop multiplexer in the sending side, signals are switched by the SW part for realizing add-drop and sent to the multiplexing parts 610, 615. Signals are multiplexed in the multiplexing parts 610, 615, and output from the sending interfaces 620, 625.

The add-drop multiplexer in the receiving side includes receiving interfaces 630, 635, demultiplexing parts 640, 645 and a SW part 650 in place of the receiving interfaces 260 and 270 in the first embodiment. In addition, it includes a client interface 665 for outputting the client signal. In the add-drop multiplexer in the receiving side, signals sent from the sending interfaces 620, 625 are received by the receiving interfaces 630, 635, and the demultiplexing parts 640, 645 demultiplexes the multiplexed signals. Then, the SW part 650 switches routes of the signals. Processes for hitless switching are the same as those of the first embodiment.

FIG. 9 shows an example of a system including cross connect apparatuses with the hitless switching capability of the present invention. The cross connect apparatus in the sending side includes a SW part 710 between the branch part 230 and the sending interfaces 240, 250 in the first embodiment. In addition, the cross connect apparatus includes a client interface 730 for receiving a client signal. In the cross connect apparatus in the sending side, routes of signals are switched by the SW part 710, and the signals are sent to the sending interfaces.

The cross connect apparatus in the receiving side includes a SW part 720 between the receiving interfaces 260, 270 and the elastic store memories 280, 290. In addition, it includes a client interface 740 for outputting the client signal. In the cross connect apparatus in the receiving side, signals sent from the sending interfaces are received by the receiving interfaces, and the SW part 720 switches the routes of the signals. Processes for hitless switching are the same as those of the first embodiment.

In the examples shown in FIGS. 7-9, although the configuration is based on hitless switching of the first embodiment, configurations of hitless switching of the second and third Embodiments can be used.

As mentioned above, according to the present invention, phase differences among the first virtual concatenation signals and the second virtual concatenation signals transmitted over a plurality of different routes are detected by using the H4 byte multi-frame in virtual concatenation defined in ITU-T G.707. Then, the elastic store memories absorb the phase differences. Therefore, hitless switching can be realized for signals of intermediate bandwidth corresponding to virtual concatenation such as VC-3-Xv (50×X Mbit/s (X is an integer of 1~256)) and VC-4-Xv (150×X Mbit/s (X is an integer of 1~256)) other than VC-3, VC-4 and VC-4-Xc(X is 4, 16, 64 or 256). In addition, virtual concatenation can be compatible with hitless switching, and path trace by J1 byte can be compatible with hitless switching. In addition, it can be avoided that complexity of the apparatuses in the system increases, and increase of delay can be avoided.

The present invention is not limited to the specifically disclosed Embodiments, and variations and modifications may be made without departing from the scope of the present invention.

What is claimed is:

1. A hitless switching system for switching between signals transmitted over a plurality of transmission lines, said hitless switching system comprising a sending apparatus and a receiving apparatus, said sending apparatus comprising:
a distributing part for dividing an original signal into a plurality of signals; and
a transmitting part for transmitting the divided signals over one or a plurality of transmission lines with redundancy, said receiving apparatus comprising:
a phase difference detection part for detecting phase difference between the divided signals sent from said sending apparatus;
a phase difference absorbing part for absorbing said phase difference detected by said phase difference detection part;
selectors each of which selects one signal from the divided signals in which said phase difference is absorbed by said phase difference absorbing part; and
a restoring part for restoring the original signal from signals output from said selectors, said distributing part comprising:
a part for dividing said original signal into virtual concatenation signals as the divided signals by using virtual concatenation technology; and
a part for inserting H4 byte multi-frame into each virtual concatenation signal,
wherein said phase difference detection part detects said phase difference by using the H4 byte multi-frame, and said phase difference absorbing part absorbs said phase difference by using elastic store memories.

2. The hitless switching system as claimed in claim 1, said sending apparatus further comprising branch parts each of which branches one of the divided signals into a first signal and a second signal,
   wherein said transmitting part transmits first signals and second signals,
   said receiving apparatus aligns phases of said first signals and said second signals, and provides said first signals and said second signals to said selectors.

3. The hitless switching system as claimed in claim 1, said hitless switching system comprising, in place of said selectors and said restoring part:
   restoring parts for restoring a plurality of original signals from signals after said phase difference is absorbed by said phase difference absorbing part; and
   a selector for selects one original signal from said original signals.

4. The hitless switching system as claimed in claim 1, said sending apparatus further comprising:
   a plurality of branch parts each of which branches one of the signals divided by the distributing part into a first signal and a second signal; and
   a selector for selecting a second signal from a plurality of second signals output from said branch parts;
   wherein said transmitting part transmits the selected second signal and a plurality of first signals, and
   said receiving apparatus aligns phases of said selected second signal and said first signals, branches said selected second signal into a plurality of second signals, and supplies said second signals and said first signals to said selectors.

5. A hitless switching system for switching between signals transmitted over a plurality of transmission lines, the hitless switching system comprising a sending apparatus and a receiving apparatus,
   the sending apparatus comprising:
   a distributing part for dividing an original signal into virtual concatenation signals by using virtual concatenation technology;
   indicator providing parts for inserting an indicator into an H4 byte multi-frame in each of the virtual concatenation signals, the indicator being for detecting phase differences among the virtual concatenation signals;
   branch parts each of which divides each of the virtual concatenation signals into two different systems;
   first sending parts for sending virtual concatenation signals of one system of the two different systems to a first transmission line; and
   second sending parts for sending virtual concatenation signals of the other system of the two different systems to a second transmission line;
   the receiving apparatus comprising:
   receiving parts for receiving all of the virtual concatenation signals transmitted over the first transmission line and the second transmission line from the sending apparatus;
   a phase difference detection part for detecting phase differences among the received virtual concatenation signals;
   phase difference absorbing parts for absorbing the phase differences detected by the phase difference detection part;
   switching parts each of which switches between virtual concatenation signals of the branched two systems; and
   a restoring part for restoring the original signal from signals output from said switching parts.

6. A hitless switching system for switching between signals transmitted over a plurality of transmission lines, the hitless switching system comprising a sending apparatus and a receiving apparatus,
   the sending apparatus comprising:
   a branch part for branching an original signal into two different systems:
   a first distributing part for dividing a first original signal of one system of the two different systems into virtual concatenation signals by using virtual concatenation technology;
   a second distributing part for dividing a second original signal of the other system of the two different systems into virtual concatenation signals by using virtual concatenation technology;
   first indicator providing parts for inserting an indicator into an H4 byte multi-frame of each of the virtual concatenation signals divided from the first original signal, the indicator being for detecting phase differences among the virtual concatenation signals;
   second indicator providing parts for inserting an indicator into an H4 byte multi-frame of each of the virtual concatenation signals divided from the second original signal, the indicator being for detecting phase differences among the virtual concatenation signals;
   first sending parts for sending the virtual concatenation signals divided from the first original signal to a first transmission line;
   second sending parts for sending the virtual concatenation signals divided from the second original signal to a second transmission line;
   the receiving apparatus comprising:
   receiving parts for receiving all of the virtual concatenation signals transmitted over the first transmission line and the second transmission line from the sending apparatus;
   a phase difference detection part for detecting phase differences among the received virtual concatenation signals;
   phase difference absorbing parts for absorbing the phase differences detected by the phase difference detection part;
   a first restoring part for restoring the first original signal from the virtual concatenation signal, divided from the first original signal, from which phase differences are absorbed;
   a second restoring part for restoring the second original signal from the virtual concatenation signal, divided from the second original signal, from which phase differences are absorbed; and
   a switching part for selecting an original signal from the restored first original signal and the second original signal.

7. A hitless switching system for switching between signals transmitted over a plurality of transmission lines, the hitless switching system comprising a sending apparatus and a receiving apparatus.
   the sending apparatus comprising:
   a distributing part for dividing an original signal into virtual concatenation signals by using virtual concatenation technology;
   indicator providing parts for inserting an indicator into an H4 byte multi-frame in each of the virtual concatenation signals, the indicator being for detecting phase differences among the virtual concatenation signals;

branch parts each of which branches each of the virtual concatenation signals into a first virtual concatenation signal and a second virtual concatenation signal;

a selector for selecting a second virtual concatenation signal from the second virtual concatenation signals;

first sending parts for sending the first virtual concatenation signals to a first transmission line; and a second sending part for sending the second virtual concatenation signal selected from the second virtual concatenation signals by the selector to a second transmission line;

the receiving apparatus comprising:

receiving parts for receiving all of the virtual concatenation signals transmitted over the first transmission line and the second transmission line from the sending apparatus;

a phase difference detection part for detecting phase differences among the received virtual concatenation signals;

phase difference absorbing parts for absorbing the phase differences detected by the phase difference detection part;

a branch part for branching the second virtual concatenation signal from which phase difference is absorbed into the second virtual concatenation signals;

switching parts each receiving one of the first virtual concatenation signal from which phase difference are absorbed and receiving one of the branched second virtual concatenation signals that are branched by the branch part in the receiving apparatus, and switching between the first virtual concatenation signal and the second concatenation signal; and a restoring part for restoring the original signal from virtual concatenation signals output from the switching parts.

8. A receiving apparatus used in a hitless switching system for switching between signals transmitted over a plurality of transmission lines, the hitless switching system comprising a sending apparatus comprising:

a distributing part for dividing an original signal into virtual concatenation signals by using virtual concatenation technology;

indicator providing parts for inserting an indicator into an H4 byte multi-frame in each of the virtual concatenation signals, the indicator being for detecting phase differences among the virtual concatenation signals;

branch parts each of which divides each of the virtual concatenation signals into two different systems;

first sending parts for sending virtual concatenation signals of one system of the two different systems to a first transmission line; and second sending parts for sending virtual concatenation signals of the other system of the two different systems to a second transmission line;

the receiving apparatus comprising:

receiving parts for receiving all of the virtual concatenation signals transmitted over the first transmission line and the second transmission line from the sending apparatus;

a phase difference detection part for detecting phase differences among the received virtual concatenation signals using the H4 byte multi-frame in each of the virtual concatenation signals;

phase difference absorbing parts for absorbing the phase differences detected by the phase difference detection part using elastic store memories;

switching parts each of which switches between virtual concatenation signals of the branched two systems; and a restoring part for restoring the original signal from signals output from said switching parts.

9. A receiving apparatus used in a hitless switching system for switching between signals transmitted over a plurality of transmission lines, the hitless switching system comprising a sending apparatus comprising:

a branch part for branching an original signal into two different systems;

a first distributing part for dividing a first original signal of one system of the two different systems into virtual concatenation signals by using virtual concatenation technology;

a second distributing part for dividing a second original signal of the other system of the two different systems into virtual concatenation signals by using virtual concatenation technology;

first indicator providing parts for inserting an indicator into an H4 byte multi-frame of each of the virtual concatenation signals divided from the first original signal, the indicator being for detecting phase differences among the virtual concatenation signals;

second indicator providing parts for inserting an indicator into an H4 byte multi-frame of each of the virtual concatenation signals divided from the second original signal, the indicator being for detecting phase differences among the virtual concatenation signals;

first sending parts for sending the virtual concatenation signals divided from the first original signal to a first transmission line;

second sending parts for sending the virtual concatenation signals divided from the second original signal to a second transmission line;

the receiving apparatus comprising:

receiving parts for receiving all of the virtual concatenation signals transmitted over the first transmission line and the second transmission line from the sending apparatus;

a phase difference detection part for detecting phase differences among the received virtual concatenation signals using the H4 byte multi-frame in each of the virtual concatenation signals;

phase difference absorbing parts for absorbing the phase differences detected by the phase difference detection part using elastic store memories;

a first restoring part for restoring the first original signal from the virtual concatenation signal, divided from the first original signal, from which phase differences are absorbed;

a second restoring part for restoring the second original signal from the virtual concatenation signal, divided from the second original signal, from which phase differences are absorbed; and a switching part for selecting an original signal from the restored first original signal and the second original signal.

10. A receiving apparatus used in a hitless switching system for switching between signals transmitted over a plurality of transmission lines, the hitless switching system comprising a sending apparatus comprising:

a distributing part for dividing an original signal into virtual concatenation signals by using virtual concatenation technology;

indicator providing parts for inserting an indicator into an H4 byte multi-frame in each of the virtual concatenation signals, the indicator being for detecting phase differences among the virtual concatenation signals;

branch parts each of which branches each of the virtual concatenation signals into a first virtual concatenation signal and a second virtual concatenation signal;

a selector for selecting a second virtual concatenation signal from the second virtual concatenation signals;

first sending parts for sending the first virtual concatenation signals to a first transmission line; and a second sending part for sending the second virtual concatenation signal selected from the second virtual concatenation signals by the selector to a second transmission line;

the receiving apparatus comprising:

receiving parts for receiving all of the virtual concatenation signals transmitted over the first transmission line and the second transmission line from the sending apparatus;

a phase difference detection part for detecting phase differences among the received virtual concatenation signals using the H4 byte multi-frame in each of the virtual concatenation signals;

phase difference absorbing parts for absorbing the phase differences detected by the phase difference detection part using elastic store memories;

a branch part for branching the second virtual concatenation signal from which phase difference is absorbed into the second virtual concatenation signals;

switching parts each receiving one of the first virtual concatenation signal from which phase difference are absorbed and receiving one of the branched second virtual concatenation signals that are branched by the branch part in the receiving apparatus, and switching between the first virtual concatenation signal and the second concatenation signal; and a restoring part for restoring the original signal from virtual concatenation signals output from the switching parts.

* * * * *